US010428750B2

(12) United States Patent
Fukui (10) Patent No.: US 10,428,750 B2
(45) Date of Patent: Oct. 1, 2019

(54) TURBOCHARGED INTERNAL COMBUSTION ENGINE SYSTEM (71) Applicant: TOYOTA JIDOSHA KABUSHIKI KAISHA, Toyota-shi, Aichi-ken (JP)

(72) Inventor: Wataru Fukui, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 116 days.

(21) Appl. No.: 15/589,361

(22) Filed: May 8, 2017

(65) Prior Publication Data
US 2017/0328288 A1  Nov. 16, 2017

(30) Foreign Application Priority Data

May 10, 2016 (JP) ................. 2016-094707

(51) Int. Cl.
F02D 41/00    (2006.01)
F02M 26/06    (2016.01)
(Continued)

(52) U.S. Cl.
CPC .......... *F02D 41/0007* (2013.01); *F02B 37/16* (2013.01); *F02D 9/02* (2013.01); *F02D 23/00* (2013.01); *F02D 41/0005* (2013.01); *F02D 41/0025* (2013.01); *F02D 41/0065* (2013.01); *F02D 41/042* (2013.01);
(Continued)

(58) Field of Classification Search
CPC .............. F02D 31/005; F02M 25/0706; F02M 19/086; F02M 26/15; F02B 37/16; F02B 29/0468
See application file for complete search history.

(56) References Cited

U.S. PATENT DOCUMENTS 9,115,657 B2 * 8/2015 Yoshioka ............... F02M 26/06
2013/0133634 A1   5/2013 Hiraoka et al.
(Continued)

FOREIGN PATENT DOCUMENTS

JP  2012-057582 A   3/2012
JP  2013113180 A    6/2013
(Continued)

*Primary Examiner* — Thai Ba Trieu
*Assistant Examiner* — Edward Bushard
(74) *Attorney, Agent, or Firm* — Hunton Andrews Kurth LLP (57) ABSTRACT

A control device estimates a leakage gas amount with respect to gas that leaks to an upstream side from a downstream side of a fresh air introduction valve when the fresh air introduction valve is closed. If the leakage gas amount is equal to or greater than a predetermined value when there is a request to open the fresh air introduction valve, a target opening degree of the fresh air introduction valve is determined based on the engine speed and intake pressure, and also a correction opening degree with respect to the target opening degree is calculated based on the leakage gas amount. The fresh air introduction valve is opened to an opening degree greater than the target opening degree by an amount corresponding to the correction opening degree, to thereby cause leakage gas that is accumulated in a fresh air introduction passage to flow into an intake passage together with a required amount of fresh air.

7 Claims, 7 Drawing Sheets

(51) Int. Cl.
*F02B 37/16* (2006.01)
*F02D 23/00* (2006.01)
*F02D 41/04* (2006.01)
*F02D 9/02* (2006.01)

(52) U.S. Cl.
CPC ..... *F02M 26/06* (2016.02); *F02D 2200/0406* (2013.01); *F02D 2200/1002* (2013.01); *Y02T 10/144* (2013.01); *Y02T 10/42* (2013.01); *Y02T 10/47* (2013.01)

(56) References Cited

U.S. PATENT DOCUMENTS

| | | |
|---|---|---|
| 2014/0366853 A1 | 12/2014 | Ichihara |
| 2015/0075162 A1 | 3/2015 | Yoshioka et al. |

FOREIGN PATENT DOCUMENTS

| | | |
|---|---|---|
| JP | 2015010591 A | 1/2015 |
| JP | 2015025414 A | 2/2015 |
| JP | 2015-040549 A | 3/2015 |
| JP | 2015057542 A | 3/2015 |

* cited by examiner

TURBOCHARGED INTERNAL COMBUSTION ENGINE SYSTEM

CROSS-REFERENCE TO RELATED APPLICATION

The present application claims priority to Japanese Patent Application No. 2016-094707 filed on May 10, 2016, which is incorporated herein by reference in its entirety.

FIELD

The present disclosure relates to an internal combustion engine system that includes an internal combustion engine provided with a turbocharger, a fresh air introduction apparatus, and an EGR apparatus and a control device for controlling the internal combustion engine.

BACKGROUND

In JP 2012-057582 A, an internal combustion engine with a turbocharger is disclosed which includes a fresh air introduction passage (fresh air bypass passage) that bypasses a compressor to thereby introduce fresh air from upstream of the compressor to a position downstream of a throttle valve, and a fresh air introduction valve (fresh air bypass valve) that opens and closes the fresh air introduction passage. In the internal combustion engine with a turbocharger, a low-pressure loop type EGR apparatus is provided that uses an EGR passage to connect an area downstream relative to a turbine in an exhaust passage and an area between an inlet of the fresh air introduction passage and the compressor in the intake passage.

An ECU that controls the internal combustion engine with a turbocharger suppresses the occurrence of a situation in which recirculated exhaust gas flows backward through the fresh air introduction passage, by opening the fresh air introduction valve when a pressure inside the surge tank is a negative pressure, and closing the fresh air introduction valve when the pressure inside the surge tank is a positive pressure.

SUMMARY

However, in practice, even if the fresh air introduction valve is fully closed, a leakage of gas occurs within the range of the manufacturing tolerance of the fresh air introduction valve. That is, when the pressure inside the surge tank is a positive pressure, gas leaks to the upstream side from the downstream side of the fresh air introduction valve. Consequently, when exhaust gas is recirculated by the EGR apparatus, leakage gas including exhaust gas starts to fill the upstream side of the fresh air introduction valve. If introduction of fresh air by means of the fresh air introduction valve is performed in such a state, the introduced amount of fresh air will be insufficient by an amount that corresponds to the amount of leakage gas that leaked to the upstream side of the fresh air introduction valve. The deficiency in the fresh air introduction amount leads to deceleration misfiring, and also leads to a deterioration in the controllability of the engine torque and the air-fuel ratio.

The present disclosure was made in view of the above described problem, and an object of an example of the present disclosure is to provide a control device for an internal combustion engine that can suppress a decrease in the accuracy of an amount of fresh air introduced when a fresh air introduction valve is opened that is due to the influence of leakage gas including exhaust gas that leaks to an upstream side of the fresh air introduction valve from a downstream side thereof when the fresh air introduction valve is closed.

A control device for an internal combustion engine according to an example in the present disclosure is a control device for controlling an internal combustion engine with that includes a turbocharger, a fresh air introduction apparatus and an EGR apparatus. The fresh air introduction apparatus includes a fresh air introduction passage that allows an area upstream relative to a compressor and an area downstream relative to a throttle valve in an intake passage to communicate, and a fresh air introduction valve provided in the fresh air introduction passage. The EGR apparatus is configured to recirculate a part of exhaust gas from an area downstream relative to a turbine in an exhaust passage to an area between an inlet of the fresh air introduction passage and the compressor in the intake passage.

The present control device is configured to perform at least target opening degree determination processing, leakage gas amount estimation processing, and opening degree correction processing. In the target opening degree determination processing, the present control device determines a target opening degree of the fresh air introduction valve based on an operating state of the internal combustion engine. In the leakage gas amount estimation processing, the present control device estimates a leakage gas amount of gas that leaks from a downstream side to an upstream side of the fresh air introduction valve when the fresh air introduction valve is closed. In the opening degree correction processing, if the leakage gas amount is equal to or greater than a predetermined value when opening the fresh air introduction valve, the present control device opens the fresh air introduction valve to an opening degree that is greater than the target opening degree.

According to the above described configuration, a required amount of fresh air can be introduced into the intake passage while causing leakage gas including exhaust gas to flow out rapidly to the intake passage.

In the opening degree correction processing, the present control device may perform control to open the fresh air introduction valve to an opening degree obtained by adding a correction opening degree to the target opening degree, and to increase the correction opening degree as a proportion of exhaust gas to the leakage gas, that is, an exhaust gas concentration of the leakage gas, increases. Comparing a case where the exhaust gas concentration of leakage gas is large and a case where the exhaust gas concentration of leakage gas is small, if the opening degree of the fresh air introduction valve is the same, the flow rate of fresh air (including fresh air in the leakage gas) that passes through the fresh air introduction valve will be smaller in the case where the exhaust gas concentration of the leakage gas is large. Therefore, as described above, by adjusting the correction opening degree in accordance with the proportion of exhaust gas to the leakage gas, the occurrence of a situation in which the flow rate of fresh air that passes through the fresh air introduction valve varies according to the exhaust gas concentration of the leakage gas can be suppressed.

In addition, in the opening degree correction processing, the present control device may perform control to lengthen a time period in which the correction opening degree is added to the target opening degree as the leakage gas amount increases, and to shorten the time period in which the correction opening degree is added to the target opening degree as the correction opening degree increases. The longer that the time period is in which the correction opening degree is added, or the larger that the correction opening degree is, the greater the amount of gas that will pass through the fresh air introduction valve and flow out into the intake passage. Therefore, as described above, by adjusting the time period in which the correction opening degree is added in accordance with the leakage gas amount and the correction opening degree, the occurrence of a situation in which leakage gas remains in the fresh air introduction passage or in which an excessive amount of fresh air flows into the intake passage can be suppressed.

In the leakage gas amount estimation processing, the present control device may perform control to calculate a gas amount per unit time that flows from the downstream side to the upstream side of the fresh air introduction valve in a case where a pressure on the downstream side is higher than a pressure on the upstream side of the fresh air introduction valve, and a gas amount per unit time that flows from the upstream side to the downstream side of the fresh air introduction valve in a case where a pressure on the upstream side is higher than a pressure on the downstream side of the fresh air introduction valve, respectively, and estimate the leakage gas amount by integrating the calculated gas amounts. It is thereby possible to accurately estimate a leakage gas amount.

The present control device may also be configured to perform any one or a plurality of the following first, second and third scavenging control processing.

The first scavenging control processing is scavenging control processing that is performed in a case where, at a time that the fresh air introduction valve is closed, the leakage gas amount is equal to or greater than a predetermined value, and a pressure on the upstream side is higher than a pressure on the downstream side of the fresh air introduction valve. In the first scavenging control processing, when the foregoing conditions are satisfied, the present control device performs control to open the fresh air introduction valve to cause leakage gas equivalent to the leakage gas amount to flow into the intake passage at a position downstream relative to the throttle valve together with fresh air, and by an actuator operation that has a torque reducing effect, to counterbalance a torque increasing effect produced by introduction of fresh air into the intake passage from the fresh air introduction passage.

The second scavenging control processing is scavenging control processing that is performed in a case where, at a time that the fresh air introduction valve is closed, the leakage gas amount is equal to or greater than a predetermined value, a pressure on the downstream side is higher than a pressure on the upstream side of the fresh air introduction valve, and recirculation of exhaust gas is not being performed by the EGR apparatus. In the second scavenging control processing, when the foregoing conditions are satisfied, the present control device performs control to open the fresh air introduction valve to cause leakage gas equivalent to the leakage gas amount to flow into the intake passage at a position upstream relative to the compressor together with fresh air, and by an actuator operation that has a torque increasing effect, to counterbalance a torque reducing effect that is produced by a backward flow of fresh air to the fresh air introduction passage from the intake passage.

The third scavenging control processing is scavenging control processing that is performed in a case where there is a request to stop the internal combustion engine. In the third scavenging control processing, when the foregoing condition is satisfied, the present control device performs control to open the fresh air introduction valve to cause leakage gas equivalent to the leakage gas amount to flow into the intake passage at a position downstream relative to the throttle valve together with fresh air, and by an actuator operation that has a torque reducing effect, to counterbalance a torque increasing effect produced by introduction of fresh air to the intake passage from the fresh air introduction passage.

According to the first, second and third scavenging control processing, leakage gas that leaks into the fresh air introduction passage can be caused to flow out into the intake passage while suppressing torque fluctuations.

According to the control device for an internal combustion engine of the present invention, since a required amount of fresh air can be introduced into an intake passage while causing leakage gas that includes exhaust gas to flow out rapidly to the intake passage, a decrease in accuracy with respect to an amount of fresh air introduced when a fresh air introduction valve is opened that is due to the influence of leakage gas which includes exhaust gas that leaked out to an upstream side from a downstream side when the fresh air introduction valve was closed can be suppressed.

BRIEF DESCRIPTION OF DRAWINGS

FIG. 2 is a view illustrating functions that a the control device of an embodiment of the present disclosure is equipped with;

DESCRIPTION OF EMBODIMENTS

An embodiment of the present disclosure is described hereunder with reference to the accompanying drawings.

1. Configuration of Internal Combustion Engine

Figure 1:
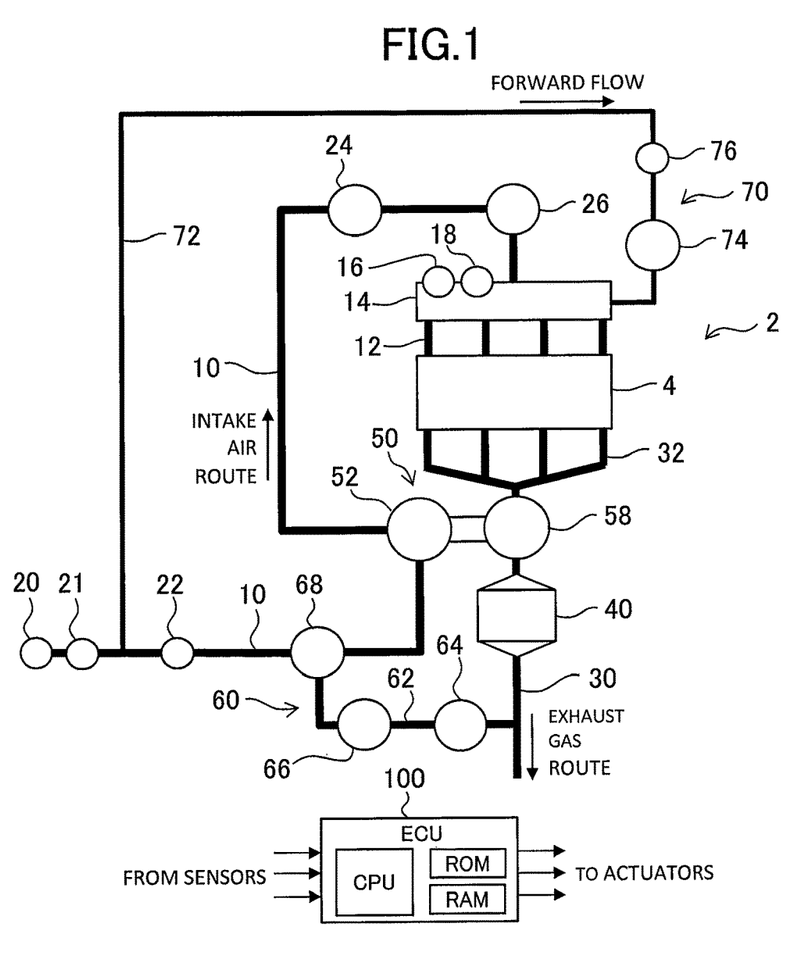
FIG. 1 is a schematic diagram illustrating a system configuration of an internal combustion engine of an embodiment of the present disclosure.

FIG. 1 is a schematic diagram illustrating the system configuration of an internal combustion engine of an embodiment of the present disclosure. An internal combustion engine (hereunder, referred to simply as "engine") 2 according to the present embodiment includes an engine main body 4 that is constructed as a spark ignition four-stroke reciprocating engine that is to be mounted in an automobile. A plurality of cylinders that are not illustrated in the drawing are formed in the engine main body 4. A large number of apparatuses and actuators, none of which are illustrated in the drawing, are also installed in the engine main body 4, such as an intake valve, a variable valve train that drives the intake valve, an exhaust valve, a variable valve train that drives the exhaust valve, spark plugs and fuel injection valves.

An intake manifold 12 that connects to an intake port of each cylinder is connected to the engine main body 4. The intake manifold 12 is connected to an intake passage 10 through a surge tank 14. A compressor 52, a throttle valve 24 and an intercooler 26 are disposed in the intake passage 10 in that order from the upstream side toward the engine main body 4. An air flow meter 20 that outputs a signal in accordance with a flow rate of fresh air drawn into the intake passage 10 is mounted at an inlet of the intake passage 10. Pressure sensors 22 and 16 and temperature sensors 21 and 18 are mounted at areas that are upstream of the compressor 52 in the intake passage 10 and in the surge tank 14, respectively. However, mounting of the pressure sensor 22 at an area upstream of the compressor 52 is not necessarily essential with respect to the configuration of the present embodiment.

An exhaust manifold 32 that connects to an exhaust port of each cylinder is connected to the engine main body 4. The exhaust manifold 32 is connected to an exhaust passage 30. A turbine 58 that, together with the compressor 52, constitutes a turbocharger 50, and a catalyst device 40 are disposed in the exhaust passage 30 in that order from the engine main body 4 toward the downstream side.

The engine 2 includes an EGR apparatus 60 that recirculates some exhaust gas from the exhaust passage 30 to the intake passage 10. The EGR apparatus 60 includes an EGR passage 62, an EGR cooler 64, an EGR valve 66 and a mixer 68. The EGR passage 62 allows the exhaust passage 30 to communicate from a position downstream of the catalyst device 40 with the intake passage 10 at a position upstream of the compressor 52. That is, the EGR apparatus 60 is configured as a so-called "low-pressure loop type EGR apparatus". The mixer 68 is provided at a connecting portion where the intake passage 10 and the EGR passage 62 are connected, and promotes mixing of fresh air that flows through the intake passage 10 with exhaust gas (EGR gas) introduced from the EGR passage 62. The EGR cooler 64 is provided in the EGR passage 62, and cools EGR gas that flows through the EGR passage 62. The EGR valve 66 is provided in the EGR passage 62 at a downstream position relative to the EGR cooler 64 in the direction of the flow of EGR gas.

The engine 2 is equipped with a fresh air introduction apparatus 70 that bypasses the compressor 52 and introduces fresh air from upstream of the compressor 52 to the downstream side of the throttle valve 24. The fresh air introduction apparatus 70 includes a fresh air introduction passage 72 and a fresh air introduction valve 74. The fresh air introduction passage 72 allows the intake passage 10 to communicate from a position upstream relative to the mixer 68 with the surge tank 14. The fresh air introduction valve 74 is provided in the fresh air introduction passage 72. Various kinds of valves such as a step valve, a rotary valve, a DC valve and the like can be used as the fresh air introduction valve 74. An oxygen sensor 76 that outputs a signal in accordance with an oxygen concentration in gas is mounted at a location upstream relative to the fresh air introduction valve 74 in the fresh air introduction passage 72. However, mounting of the oxygen sensor 76 in the fresh air introduction passage 72 is not necessarily essential with respect to the configuration of the present embodiment.

Operation of the engine 2 is controlled by a control device 100. In addition to the air flow meter 20, the pressure sensors 22 and 16, the temperature sensors 21 and 18 and the oxygen sensor 76, various other sensors such as an accelerator opening degree sensor and a crank angle sensor which are not illustrated in the drawing are connected to the control device 100. The control device 100 controls operations of the engine 2 by actuating various apparatuses and actuators included in the engine 2 based on information obtained from these sensors. The control device 100 is an ECU (electronic control unit) that has at least one CPU, at least one ROM, and at least one RAM. However, the control device 100 may include a plurality of ECUs. Various functions relating to engine control are realized by the control device 100 by loading a program stored in the ROM to the RAM, and executing the program with the CPU.

2. Functions which the Control Device is Equipped with

Figure 2:
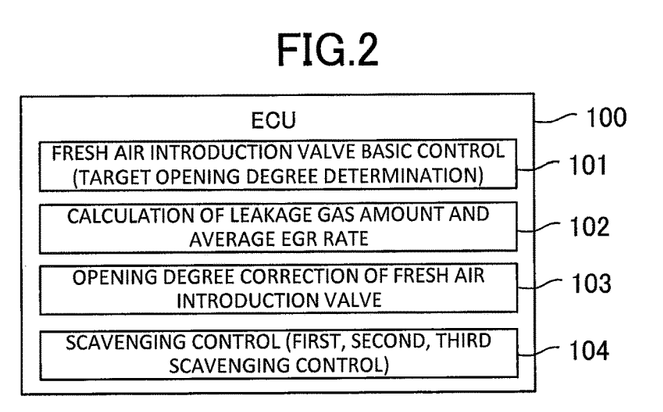

FIG. 2 is a view in which, among various functions that the control device 100 is equipped with, function that, in particular, relate to control of the fresh air introduction apparatus 70 are extracted and represented with blocks. Although the control device 100 is also equipped with various other functions, diagrammatic representation with respect to those other functions is omitted. In FIG. 2, arithmetic units 101 to 104 are allocated to respective functions. However, the respective arithmetic units 101 to 104 do not actually exist as hardware, and are realized virtually when software stored on the ROM is executed by the CPU.

2-1. Basic Control of Fresh Air Introduction Valve

Figure 3:
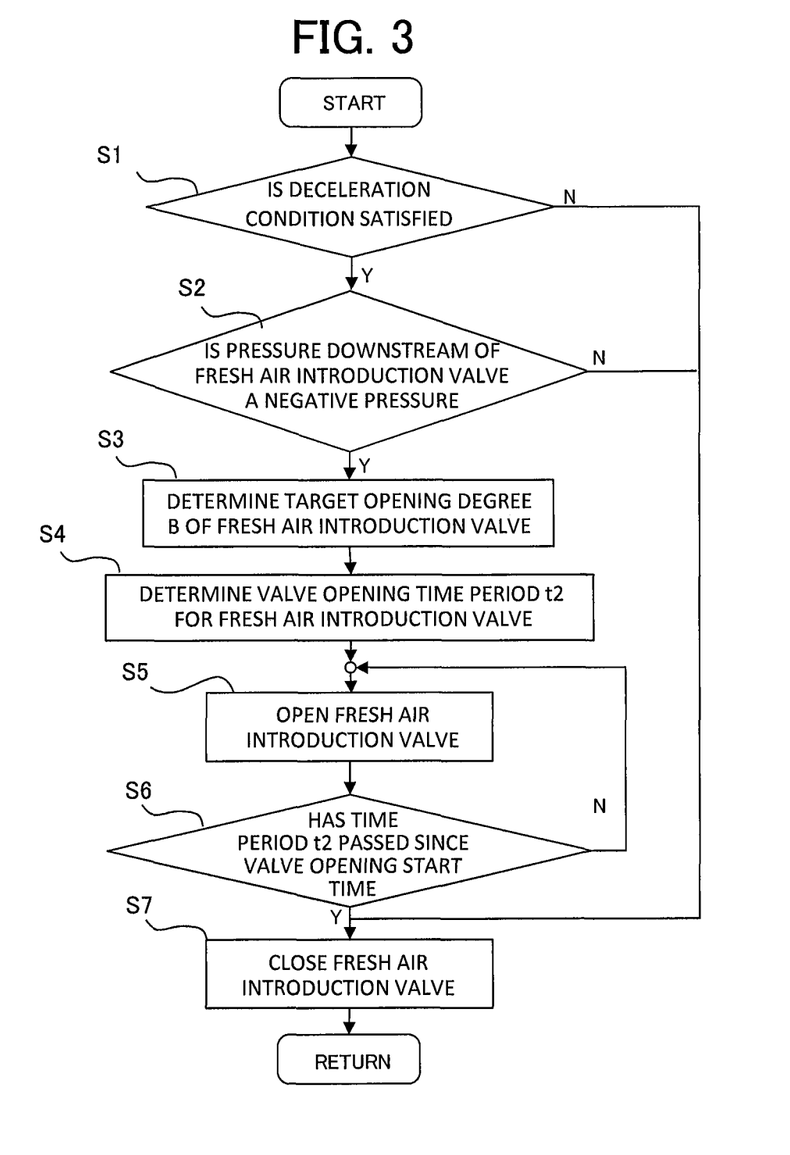
FIG. 3 is a flowchart illustrating a flow of processing of basic control of a fresh air introduction valve.

The arithmetic unit 101 is configured to perform processing relating to basic control of the fresh air introduction valve 74. In relation to the claims, a function as target opening degree determination means is included in the functions that the arithmetic unit 101 is equipped with. FIG. 3 is a flowchart illustrating the flow of processing of basic control of the fresh air introduction valve 74 by the arithmetic unit 101. Hereunder, details of the processing that the arithmetic unit 101 performs are described using FIG. 3.

In step S1 in the flowchart in FIG. 3, the arithmetic unit 101 determines whether or not the operating state satisfies a predetermined deceleration condition. Specifically, the arithmetic unit 101 determines whether or not a time differential value of an accelerator operation amount is a negative value, and an absolute value thereof is less than a threshold value determined by adaptation. That is, a condition that the operating state is a gradual deceleration state of a degree in which a fuel-cut operation is not performed is one condition for performing the introduction of fresh air by the fresh air introduction apparatus 70. By introducing fresh air via the fresh air introduction passage 72, the EGR rate of gas drawn into the cylinders from the intake passage 10 can be decreased, and the occurrence of misfiring and destabilization of combustion can be suppressed. If the operating state does not satisfy the deceleration condition, the arithmetic unit 101 selects the processing in step S7 and thereby maintains the fresh air introduction valve 74 in a closed state.

If the operating state satisfies the deceleration condition, next, the arithmetic unit 101 performs a determination operation in step S2. In step S2, the arithmetic unit 101 determines whether the pressure on the downstream side of the fresh air introduction valve 74 is a negative pressure. That is, the pressure on the downstream side of the fresh air introduction valve 74 being lower than the pressure on the upstream side is one more condition for performing the introduction of fresh air by the fresh air introduction apparatus 70. Specifically, this determination is made by measuring the pressure in the surge tank 14 using the pressure sensor 16, and determining whether or not the pressure in the surge tank 14 is a negative pressure. If the pressure on the downstream side of the fresh air introduction valve 74 is a positive pressure, the arithmetic unit 101 selects the processing in step S7 and thus maintains the fresh air introduction valve 74 in a closed state.

If the pressure on the downstream side of the fresh air introduction valve 74 is a negative pressure, the arithmetic unit 101 executes the processing in step S3. In step S3, the arithmetic unit 101 determines a target opening degree B of the fresh air introduction valve 74 based on the pressure inside the surge tank 14 measured by the pressure sensor 16 and the engine speed. A map in which target opening degrees are associated with pressures in the surge tank and engine speeds is used to determine the target opening degree B.

Further, in step S4, the arithmetic unit 101 determines a valve opening time period t2 of the fresh air introduction valve 74 based on the time differential value of the accelerator operation amount. A map in which valve opening time periods are associated with time differential values of the accelerator operation amount is used to determine the valve opening time period t2.

In step S5, the arithmetic unit 101 opens the fresh air introduction valve 74 in accordance with the target opening degree B determined in step S3. Note that, as described in detail later, in some cases, when opening the fresh air introduction valve 74, a correction opening degree is added to the target opening degree B. Correction of the opening degree of the fresh air introduction valve 74 is performed by the arithmetic unit 103 as described later.

In step S6, the arithmetic unit 101 determines whether or not the valve opening time period t2 determined in step S4 has elapsed since the time that the fresh air introduction valve 74 was opened. This determination is performed in each calculation cycle. Until the valve opening time period t2 elapses, the arithmetic unit 101 selects the processing in step S5 to thereby maintain the fresh air introduction valve 74 in an open state.

Subsequently, when the valve opening time period t2 has passed, in step S7, the arithmetic unit 101 closes the fresh air introduction valve 74. Thereby, the introduction of fresh air by opening the fresh air introduction valve 74 ends. Note that, because the purpose of introducing fresh air by opening the fresh air introduction valve 74 is to decrease the EGR rate, it is also possible to estimate the EGR rate inside the intake manifold 12, and close the fresh air introduction valve 74 upon the estimated EGR rate falling below a certain threshold value.

2-2. Calculation of Leakage Gas Amount and Average EGR Rate of Leakage Gas

Figure 4:
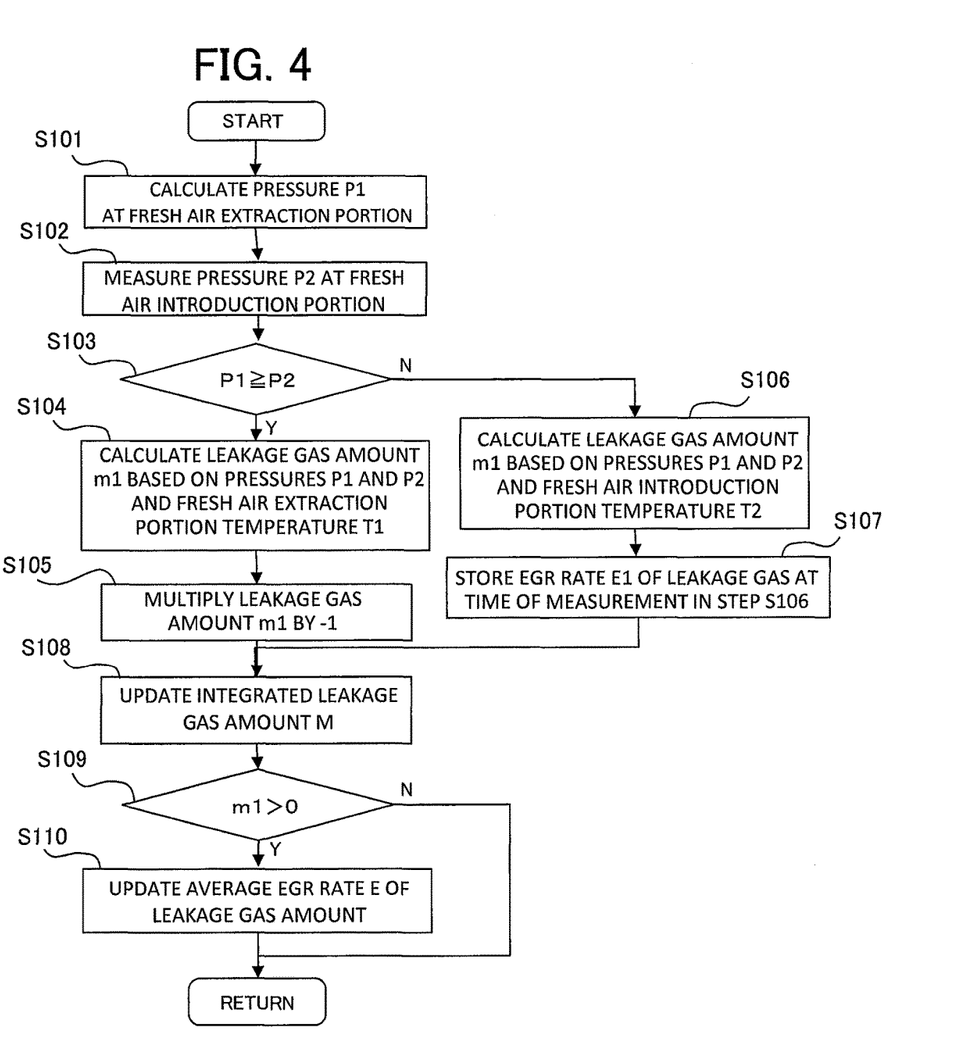
FIG. 4 is a flowchart illustrating a flow of processing to calculate a leakage gas amount and an average EGR rate.

The arithmetic unit 102 is configured to estimate a leakage gas amount with respect to gas that leaks out from the downstream side of the fresh air introduction valve 74 to the upstream side when the fresh air introduction valve 74 is closed, and also estimate an average EGR rate of the leakage gas. In relation to the claims, a function as leakage gas amount estimation means is included in the functions that the arithmetic unit 102 is equipped with. FIG. 4 is a flowchart illustrating the flow of processing performed by the arithmetic unit 102 to calculate a leakage gas amount and an average EGR rate. Hereunder, details of the processing that the arithmetic unit 102 performs are described using FIG. 4 and FIG. 5 to FIG. 7 that relate to FIG. 4.

Figure 5:
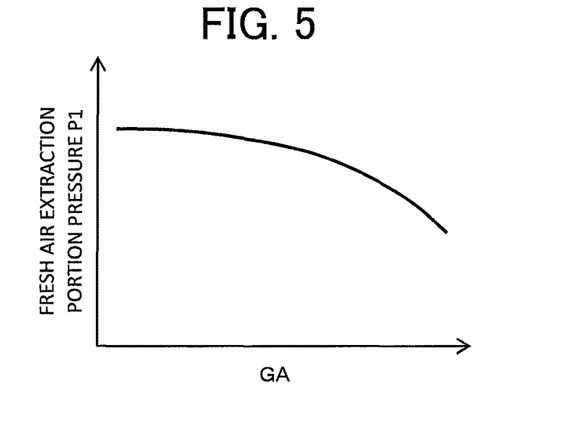
FIG. 5 is a view illustrating an image of a map associating a flow rate GA of fresh air measured by the air flow meter and the pressure P1 at a fresh air extraction portion.

In step S101 in the flowchart in FIG. 4, the arithmetic unit 102 calculates a pressure P1 at a portion at which the fresh air introduction apparatus 70 extracts fresh air from the intake passage 10, that is, a portion at which the fresh air introduction passage 72 branches from the intake passage 10. A map is used for the aforementioned calculation. An image of the map is illustrated in FIG. 5. In the map, a flow rate GA of fresh air measured by the air flow meter 20 and the pressure P1 at a fresh air extraction portion are associated. Since a pressure loss inside the intake passage 10 increases as the fresh air flow rate GA increases, the larger that the fresh air flow rate GA is, the smaller the pressure P1 at the fresh air extraction portion becomes. The arithmetic unit 102 calculates the pressure P1 at the fresh air extraction portion based on the fresh air flow rate GA using the aforementioned map. However, in a case where the pressure sensor 22 is installed upstream of the compressor 52 in the intake passage 10, the pressure P1 at the fresh air extraction portion may be measured by the pressure sensor 22.

Returning to FIG. 4, the processing in step S102 will now be described. In step S102, the arithmetic unit 102 measures a pressure P2 at a portion at which the fresh air introduction apparatus 70 introduces fresh air into the intake passage 10, that is, at a portion at which the fresh air introduction passage 72 converges with the intake passage 10. The pressure sensor 16 installed in the surge tank 14 is used for this measurement. Note that, the pressure P2 at the fresh air introduction portion measured by the pressure sensor 16 is an absolute pressure, and the pressure P1 at the fresh air extraction portion calculated in step S101 is also an absolute pressure.

In step S103, the arithmetic unit 102 compares the pressure P1 at the fresh air extraction portion that is obtained in step S101 and the pressure P2 at the fresh air introduction portion that is obtained in step S102. If the pressure P1 is equal to or greater than the pressure P2, the arithmetic unit 102 executes the processing in steps S104 and S105 that are described later. In contrast, if the pressure P1 is less than the pressure P2, the arithmetic unit 102 executes the processing in steps S106 and S107 that are described later.

In step S104 that is selected when the pressure P1 is equal to or greater than the pressure P2, the arithmetic unit 102 calculates a gas amount m1 per calculation cycle which leaks from the upstream side of the fresh air introduction valve 74 to the downstream side. In this case, when the flow rate of leakage gas from the upstream side to the downstream side is taken as "$m_f$", and the temperature at the fresh air extraction portion is taken as "T1", a physical relation represented by the following throttle equation holds between the leakage gas flow rate $m_f$, the respective pressures P1 and P2 on the upstream side and downstream side of the fresh air introduction valve 74, and the temperature T1 at the fresh air extraction portion. Where, $B_0$ represents a flow rate coefficient when the fresh air introduction valve 74 is closed, and a value (fixed value) confirmed by experiment is used. R represents a gas constant.

$$m_f = B_0 \frac{P1}{\sqrt{R*T2}} \phi\left(\frac{P2}{P1}\right) \qquad \text{[Equation 1]}$$

-continued $$\text{herein, } \phi(x) = \begin{cases} \dfrac{1}{\sqrt{2}} & 0 \le x < 0.5 \\ \sqrt{2x(1-x)} & 0.5 \le x \le 1 \end{cases}$$

Figure 6:
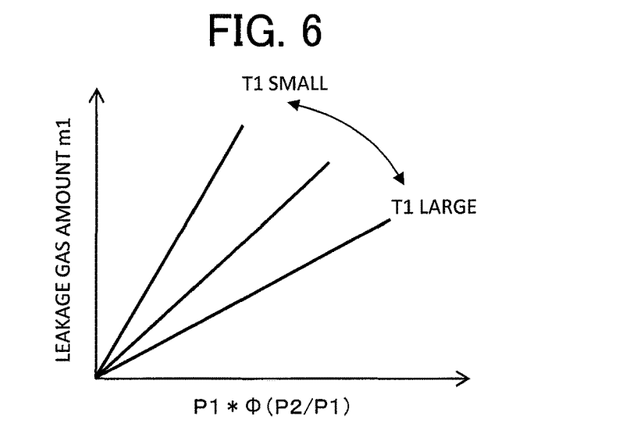
FIG. 6 is a view illustrating a relation between leakage gas amount m1, respective pressures P1 and P2 on the upstream side and downstream side of the fresh air introduction valve, and fresh air extraction portion temperature T1.

A leakage gas amount m1 is obtained by converting the leakage gas flow rate $m_f$ calculated by the above equation to a gas amount per calculation cycle. Specifically, calculation of the leakage gas amount m1 is performed using a map. An image of the map is illustrated in FIG. 6. The relation between the leakage gas amount m1, P1*ϕ(P2/P1) in the above equation, and the fresh air extraction portion temperature T1 is defined by this map. A temperature measured by the temperature sensor 21 can be used for the fresh air extraction portion temperature T1. The value for P1 *ϕ(P2/P1 ) is calculated based on the respective pressures P1 and P2 obtained in steps S101 and S102, and the leakage gas amount m1 that leaks from the upstream side of the fresh air introduction valve 74 to the downstream side is calculated by applying the calculated value for P1 *ϕ(P2/P1 ) and the fresh air extraction portion temperature T1 to the map illustrated in FIG. 6. Note that, when the temperature width of the fresh air extraction portion temperature T1 is taken into consideration, an influence that the fresh air extraction portion temperature T1 has on the leakage gas amount m1 is small in comparison to the influence of the respective pressures P1 and P2 on the leakage gas amount m1 . Therefore, a configuration may also be adopted so as to calculate the leakage gas amount m1 using a simplified map for which it is assumed that the fresh air extraction portion temperature T1 is constant.

Returning again to FIG. 4, the processing in step S105 will now be described. In step S105, the value of the leakage gas amount m1 calculated in step S104 is multiplied by −1. This is because the amount of leakage gas that is accumulated on the upstream side of the fresh air introduction valve 74 decreases by an amount corresponding to the amount of gas that leaks to the downstream side from the upstream side of the fresh air introduction valve 74.

According to the flowchart, the processing in step S108 is performed following the processing in step S105. In step S108, the arithmetic unit 102 updates the value for a leakage gas amount (hereunder, referred to as "integrated leakage gas amount") M that has accumulated on the upstream side of the fresh air introduction valve 74 up to the current time. In step S108, the integrated leakage gas amount M is updated by adding the leakage gas amount m1 obtained in step S105 to a previous value m0 of the integrated leakage gas amount M. In the next calculation, the previous value m0 will be replaced by the value of the integrated leakage gas amount M which was updated this time. Since the leakage gas amount m1 obtained in step S105 is a negative value, the integrated leakage gas amount M is decreased by the update processing in step S108.

On the other hand, in step S106 that is selected when the pressure P1 is less than the pressure P2, the arithmetic unit 102 calculates a gas amount m1 per calculation cycle which leaks from the downstream side of the fresh air introduction valve 74 to the upstream side. In this case, when the flow rate of leakage gas from the downstream side to the upstream side is taken as "$m_b$", and the temperature at the fresh air introduction portion is taken as "T2", a physical relation represented by the following throttle equation holds between the leakage gas flow rate $m_b$, the respective pressures P1 and P2 on the upstream side and downstream side of the fresh air introduction valve 74, and the temperature T2 at the fresh air introduction portion.

$$m_b = B_0 \frac{P2}{\sqrt{R*T2}} \phi\left(\frac{P1}{P2}\right) \quad \text{[Equation 2]}$$

Figure 7:
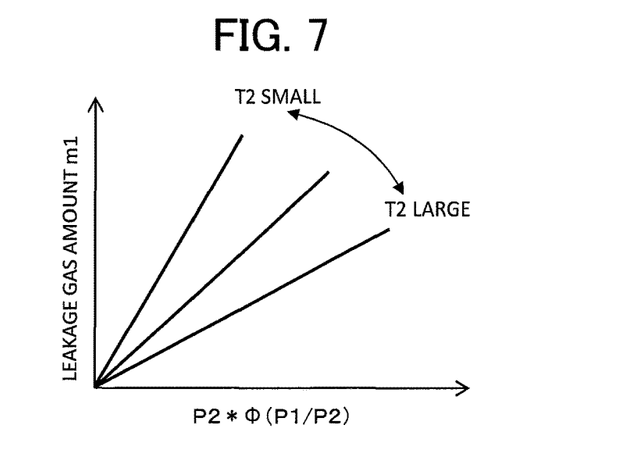
FIG. 7 is a view of a relation between the leakage gas amount m1, respective pressures P1 and P2 on the upstream side and downstream side of the fresh air introduction valve, and the fresh air introduction portion temperature T2.

The leakage gas amount m1 is obtained by converting the leakage gas flow rate $m_b$ calculated by the above equation to a gas amount per calculation cycle. Specifically, calculation of the leakage gas amount m1 is performed using a map. An image of the map is illustrated in FIG. 7. The relation between the leakage gas amount m1 , P2*ϕ(P1 /P2) in the above equation, and the fresh air introduction portion temperature T2 is defined by this map. A temperature measured by the temperature sensor 18 can be used for the fresh air introduction portion temperature T2. The value for P2*ϕ(P1 /P2) is calculated based on the respective pressures P1 and P2 obtained in steps S101 and S102, and the leakage gas amount m1 that leaks from the downstream side of the fresh air introduction valve 74 to the upstream side is calculated by applying the calculated value for P2*ϕ(P1 /P2) and the fresh air introduction portion temperature T2 to the map illustrated in FIG. 7. Note that, when the temperature width of the fresh air introduction portion temperature T2 is taken into consideration, an influence that the fresh air introduction portion temperature T2 has on the leakage gas amount m1 is small in comparison to the influence of the respective pressures P1 and P2 on the leakage gas amount m1 . Therefore, a configuration may also be adopted so as to calculate the leakage gas amount m1 using a simplified map for which it is assumed that the fresh air introduction portion temperature T2 is constant.

Returning again to FIG. 4, step S107 will now be described. In step S107, the arithmetic unit 102 stores an EGR rate E1 of leakage gas at the time point at which the calculation in step S106 was performed. The EGR rate of the leakage gas may be regarded as being equal to the EGR rate of gas flowing through the intake passage 10. The EGR rate is calculated in an unshown arithmetic unit that is different from the arithmetic unit 102, based on the opening degree of the EGR valve 66, a differential pressure between the pressure upstream of the EGR valve 66 and the pressure downstream of the EGR valve 66, and the flow rate of fresh air. Note that, the differential pressure of the EGR valve 66 may be measured by a differential pressure sensor, may be calculated based on respective measured values of the upstream pressure and downstream pressure, or may be estimated based on the operating state of the engine 2.

According to the flowchart, the processing in step S108 is performed following the processing in step S107. In step S108, the arithmetic unit 102 updates a value for the leakage gas amount (hereunder, referred to as "integrated leakage gas amount") M that has accumulated on the upstream side of the fresh air introduction valve 74 up to the current time. In step S108, the integrated leakage gas amount M is updated by adding the leakage gas amount m1 obtained in step S106 to the previous value m0 of the integrated leakage gas amount M. Since the leakage gas amount m1 obtained in step S106 is a positive value, the integrated leakage gas amount M is increased by the update processing in step S108.

In step S109, the arithmetic unit 102 determines whether or not the leakage gas amount m1 is greater than zero. In a case where calculation of the leakage gas amount m1 is performed in step S104, the leakage gas amount m1 will take a positive value, while in a case where calculation of the leakage gas amount m1 is performed in step S106, the leakage gas amount m1 will take a negative value.

If the leakage gas amount m1 is greater than zero, the arithmetic unit 102 performs the processing in step S110. In step S110, an average EGR rate E of the leakage gas that is accumulated on the upstream side of the fresh air introduction valve 74 is updated by means of the following equation, using the EGR rate E1 stored in step S107. Where, in the following equation, E0 represents the previous value of the average EGR rate E. In the next calculation, the value of the average EGR rate E which was updated this time will be replaced by the previous value E0. If the leakage gas amount m1 is equal to or less than zero, the processing in step S110 is skipped, and the value of the average EGR rate E is held.

$$E = \frac{m0*E0 + m1*E1}{m0 + m1} \qquad \text{[Equation 3]}$$

Note that methods other that the method described above are also available for determining the average EGR rate E. For example, if the oxygen sensor 76 is installed on the downstream side of the fresh air introduction valve 74 in the fresh air introduction passage 72, the average EGR rate E can be determined based on an oxygen concentration that can be measured by the oxygen sensor 76.

By performing the above described processing, the arithmetic unit 102 calculates a leakage gas amount (integrated leakage gas amount) and an average EGR rate of leakage gas in each calculation cycle. The leakage gas amount calculated by the arithmetic unit 102 is provided to the arithmetic unit 103 and the arithmetic unit 104 in each calculation cycle. Further, the average EGR rate of leakage gas calculated by the arithmetic unit 102 is provided to the arithmetic unit 103 in each calculation cycle.

2-3. Correction of Opening Degree of Fresh Air Introduction Valve

Figure 8:
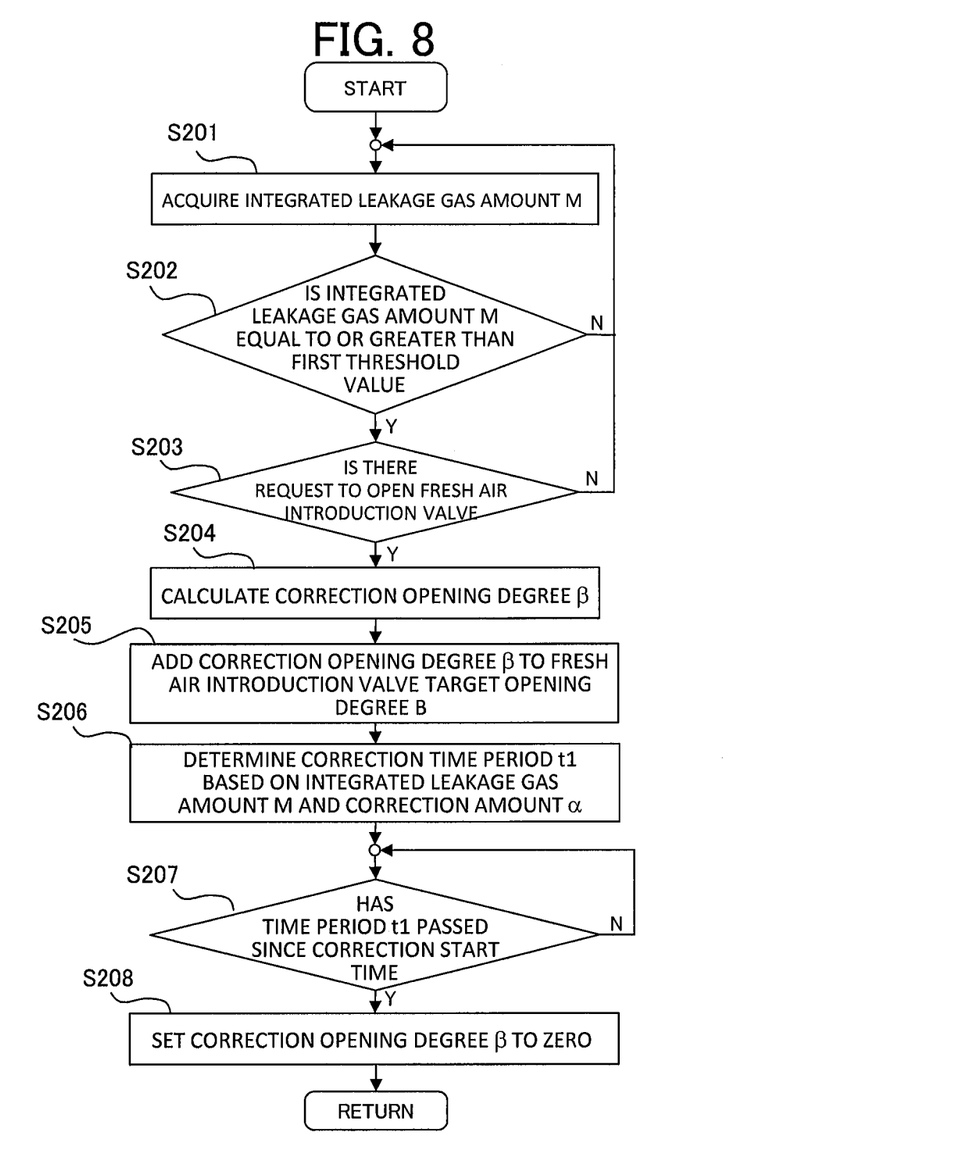
FIG. 8 is a flowchart illustrating a flow of processing for calculating a correction opening degree.

The arithmetic unit 103 is configured to perform processing relating to correction of the opening degree of the fresh air introduction valve 74, more specifically, to calculate a correction opening degree to add to the target opening degree of the fresh air introduction valve 74 as well as the correction period thereof. In relation to the claims, a function as opening degree correction means is included in the functions that the arithmetic unit 103 is equipped with. FIG. 8 is a flowchart illustrating the flow of processing for calculating a correction opening degree that is performed by the arithmetic unit 103. Hereunder, details of the processing that the arithmetic unit 103 performs are described using FIG. 8 and FIG. 9 to FIG. 11 that relate to FIG. 8.

In step S201 in the flowchart in FIG. 8, the arithmetic unit 103 acquires the integrated leakage gas amount M calculated by the arithmetic unit 101. In step S202, the arithmetic unit 103 determines whether or not that acquired integrated leakage gas amount M is equal to or greater than a previously determined first threshold value. The first threshold value is determined by taking into consideration the influence that the accumulation of leakage gas has on the engine 2. For example, because the leakage gas includes a large exhaust gas component, condensed water is liable to arise at the periphery of the fresh air introduction valve 74. Because the condensed water is acidic, there is a risk that the fresh air introduction valve 74 will be corroded due to adherence of the condensed water. Further, in a case where the condensed water flows back through the fresh air introduction passage 72, there is a risk that the condensed water will flow into the compressor 52 and lead to the occurrence of erosion or damage to an impeller. The aforementioned first threshold value is set to a value at which the possibility of damage or deterioration of the engine 2 occurring due to these influences is low.

If the integrated leakage gas amount M is equal to or greater than the first threshold value, next, the arithmetic unit 103 performs a determination operation in step S203. In step S203, the arithmetic unit 103 determines whether or not there is a request to open the fresh air introduction valve 74 based on a signal provided from the arithmetic unit 101. If there is not a request to open the fresh air introduction valve 74, or if the integrated leakage gas amount M is less than the first threshold value, the arithmetic unit 103 does not proceed to the processing in the next step 104, and instead repeats the processing from step S201 to step S203, or from step S201 to step S202 for each calculation cycle.

In a case where the integrated leakage gas amount M is equal to or greater than the first threshold value and there is a request to open the fresh air introduction valve 74, the arithmetic unit 103 performs the processing from step S204 to step S208. The processing performed in this case is processing to set a correction opening degree of the fresh air introduction valve 74. In this processing, the arithmetic unit 103 calculates a size of the correction opening degree to be added to the target opening degree B determined by the arithmetic unit 101 and also a correction time period.

First, in step S204, the arithmetic unit 103 calculates the correction opening degree to be added to the target opening degree B of the fresh air introduction valve 74. Hereunder, a method for calculating the correction opening degree adopted by the arithmetic unit 103 is described using FIG. 9 and FIG. 10.

Figure 9:
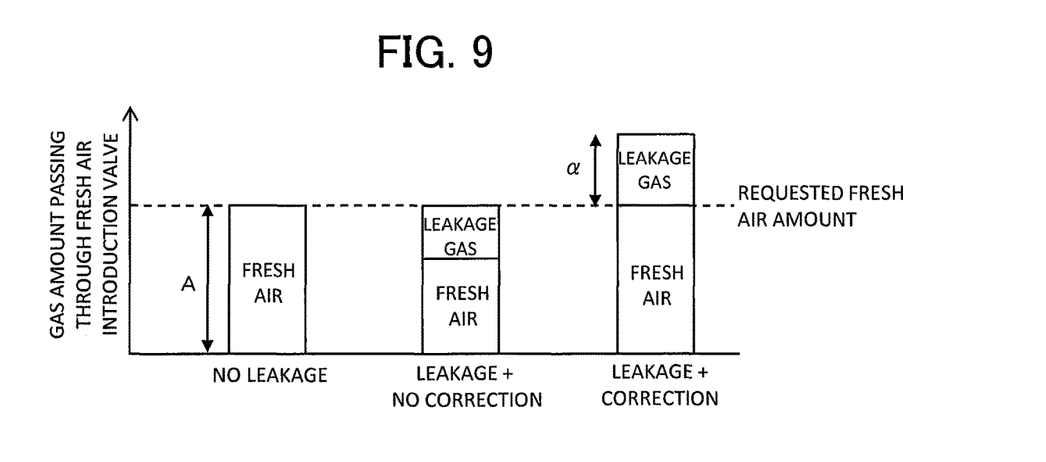
FIG. 9 is a view illustrating a method for calculating a correction amount for the gas amount that is passed through the fresh air introduction valve.

The target opening degree B of the fresh air introduction valve 74 is determined in accordance with the amount of fresh air that is requested to be introduced through the fresh air introduction valve 74. However, if leakage gas has accumulated on the upstream side of the fresh air introduction valve 74 during the time that the fresh air introduction valve 74 is closed, the amount of fresh air that can be introduced by opening the fresh air introduction valve 74 as far as the target opening degree B will be less than the requested fresh air amount. That is, as shown in FIG. 9, the fresh air amount will be insufficient by an amount corresponding to the amount of leakage gas that flows downstream when the fresh air introduction valve 74 is opened. In order to fully provide the requested fresh air amount, it is necessary to anticipate that leakage gas will also pass through the fresh air introduction valve 74 together with fresh air, and to make the gas amount that passes through the fresh air introduction valve 74 greater than the requested fresh air amount. As a correction amount α for the gas amount that is passed through the fresh air introduction valve 74, the arithmetic unit 103 calculates the leakage gas amount that passes through the fresh air introduction valve 74 in a case in which the requested fresh air amount is fully provided.

When the gas amount per unit time obtained based on the target opening degree B, that is, the requested fresh air amount, is taken as "A", the correction amount (more particularly, a correction amount per unit time) α is represented by the following equation using the average EGR rate E of the leakage gas that is provided from the arithmetic unit 101. In step S204, calculation of the correction amount α is performed according to the following equation.

$$\alpha = A * \frac{E}{100 - E} \quad \text{[Equation 4]}$$

Figure 10:
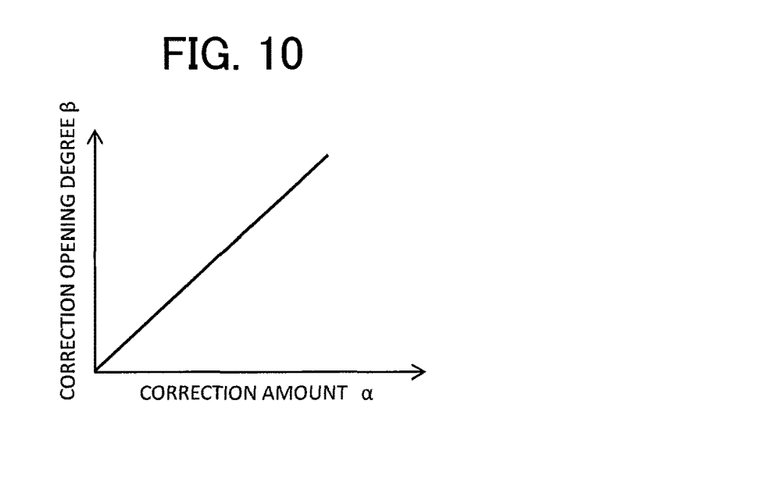
FIG. 10 is a view illustrating an image of a map for calculating the correction opening degree from the correction amount.

Next, the arithmetic unit 103 calculates a correction opening degree β corresponding to the target opening degree B of the fresh air introduction valve 74 based on the correction amount α. Calculation of the correction opening degree β is performed using a map. An image of the map is illustrated in FIG. 10. In this map, for example, the relation between the correction amount α and the correction opening degree β is linearly defined. As shown in the above equation, because the correction amount α is a function of the average EGR rate E of leakage gas, according to the relation illustrated in FIG. 10, the higher than the average EGR rate E of the leakage gas is, the larger the value that is calculated for the correction opening degree β. Thereby, the fresh air introduction valve 74 is opened to a larger opening degree as the exhaust gas concentration in leakage gas accumulated at the fresh air introduction valve 74 increases. Further, even if a leakage occurs to the downstream side of the fresh air introduction valve 74, since the correction amount α will be zero as long as EGR gas is not included therein, opening degree correction of the fresh air introduction valve 74 is not performed.

Returning to FIG. 8, step S205 will be described next. In step S205, the arithmetic unit 103 adds the correction opening degree β calculated in step S204 to the target opening degree B of the fresh air introduction valve 74.

Figure 11:
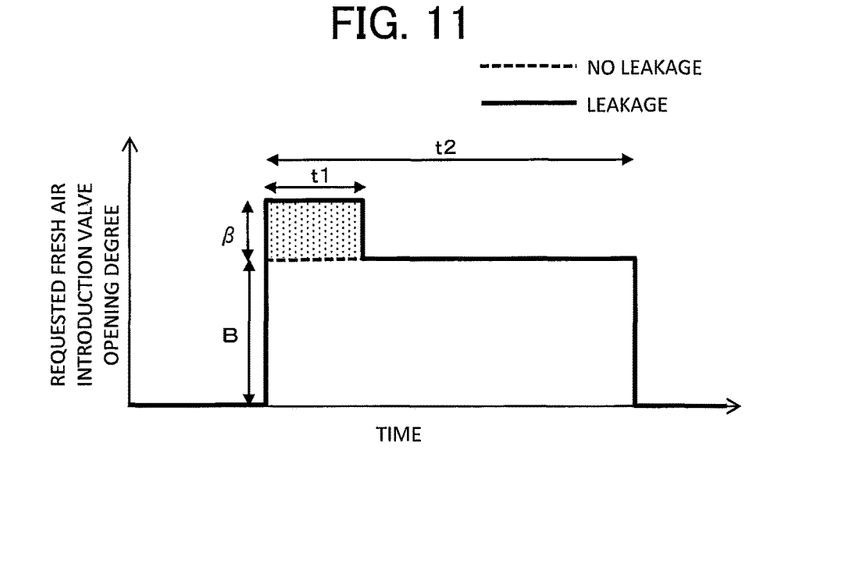
FIG. 11 is a view illustrating an image of setting correction opening degree for a target opening degree of the fresh air introduction valve.

Next, in step S206, the arithmetic unit 103 determines a correction time period for which opening degree correction of the fresh air introduction valve 74 is to be performed. In the case of performing opening degree correction of the fresh air introduction valve 74, as illustrated in FIG. 11, in accompaniment with opening of the fresh air introduction valve 74, the arithmetic unit 103 applies an opening degree obtained by adding the correction opening degree β to the target opening degree B to the fresh air introduction valve 74. A time period t1 for which addition of the correction opening degree β continues is the correction time period. If the correction time period t1 is too short, leakage gas will remain upstream of the fresh air introduction valve 74, while if the correction time period t1 is too long, excessive fresh air will flow downstream. Therefore, the arithmetic unit 103 calculates a time period obtained by dividing the integrated leakage gas amount M by the correction amount α as the correction time period t1. Note that, the correction time period t1 is always less than or equal to the valve opening time period t2 of the fresh air introduction valve 74. If the calculated correction time period t1 exceeds the valve opening time period t2, the arithmetic unit 103 adjusts the correction time period t1 to a value that is equal to or less than the valve opening time period t2.

Returning again to FIG. 8, step S207 will be described next. In step S207 the arithmetic unit 103 determines whether or not the correction time period t1 determined in step S206 has elapsed since the time that opening degree correction of the fresh air introduction valve 74 started. This determination operation is performed for each calculation cycle.

When the correction time period t1 has elapsed, the arithmetic unit 103 makes the correction opening degree β that was added to the target opening degree B of the fresh air introduction valve 74 in step S208 zero. Thus, opening degree correction of the fresh air introduction valve 74 is completed.

By performing opening degree correction of the fresh air introduction valve 74 by the above described procedure when opening the fresh air introduction valve 74, a required amount of fresh air can be introduced into the intake passage 10 while causing leakage gas that includes exhaust gas to flow out rapidly into the intake passage 10. Consequently, according to the present embodiment, a decrease in accuracy with respect to the amount of fresh air that is introduced when the fresh air introduction valve 74 is opened that is due to the influence of leakage gas that includes exhaust gas that leaks out to the upstream side from the downstream side when the fresh air introduction valve 74 is closed can be suppressed.

Note that when correction of the opening degree of the fresh air introduction valve 74 is completed, the arithmetic unit 103 notifies the arithmetic unit 102 to that effect. Upon being notified that opening degree correction is completed, the arithmetic unit 102 resets the integrated leakage gas amount M to make the value of the integrated leakage gas amount M zero. However, in a case where all of the leakage gas could not flow out due to adjustment of the correction time period t1, the arithmetic unit 102 calculates the remaining amount of leakage gas based on the integrated leakage gas amount M, the correction time period t1 and the correction amount α, and rewrites the value of the integrated leakage gas amount M to the value of the residual leakage gas amount.

2-4. Scavenging Control

By performing opening degree correction in combination with the basic control of the fresh air introduction valve 74, leakage gas including exhaust gas that is accumulated on the upstream side of the fresh air introduction valve 74 can be caused to flow into the intake passage 10 together with fresh air when the fresh air introduction valve 74 is opened. However, if the leakage gas amount is excessive, it is sometimes not possible for all of the leakage gas to flow out when the fresh air introduction valve 74 is opened a single time. Therefore, in a case where the leakage gas amount has reached a certain value, even if the valve opening conditions in the basic control of the fresh air introduction valve 74 are not satisfied, that is, even if the conditions in the aforementioned step S1 and S2 are not satisfied, the control device 100 opens the fresh air introduction valve 74 to cause leakage gas to flow into the intake passage 10. This control is referred to as "scavenging control" in the present description. More specifically, the scavenging control includes three kinds of scavenging control, that is, a first scavenging control, a second scavenging control and a third scavenging control, which are executed at different stages.

Figure 12:
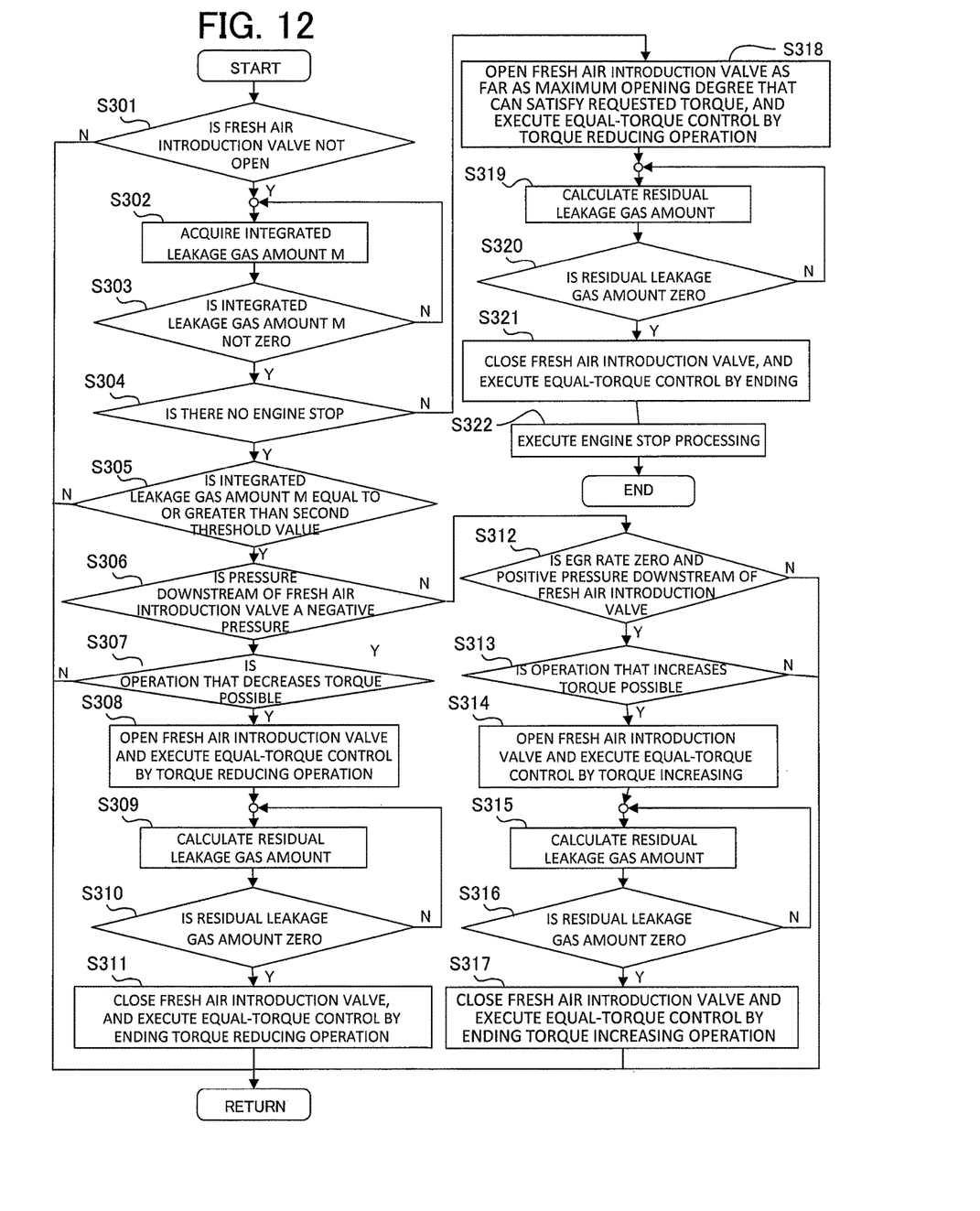
FIG. 12 is a flowchart illustrating a flow of processing for scavenging control.

The arithmetic unit 104 is configured to perform processing relating to the scavenging control. In relation to the claims, functions as first scavenging control means, second scavenging control means and third scavenging control means are included in the functions that the arithmetic unit 104 is equipped with. FIG. 12 is a flowchart illustrating the flow of processing for scavenging control performed by the arithmetic unit 104. Hereunder, details of the processing that the arithmetic unit 104 performs are described using FIG. 12.

In step S301 in the flowchart in FIG. 12, the arithmetic unit 104 determines whether or not the fresh air introduction valve 74 is open. If the fresh air introduction valve 74 is open, the arithmetic unit 104 skips the subsequent processing since it is not necessary to perform scavenging control.

If the fresh air introduction valve 74 is not open, in step S302 the arithmetic unit 104 acquires the integrated leakage gas amount M calculated by the arithmetic unit 102. Next, in step S303, the arithmetic unit 104 determines whether or not the integrated leakage gas amount M acquired in step S303 is zero, that is, whether or not leakage gas is accumulated on the upstream side of the fresh air introduction valve 74. This determination operation is performed for each calculation cycle. The arithmetic unit 104 selects the processing in step S302 and continues to acquire the integrated leakage gas amount M from the arithmetic unit 102 until the integrated leakage gas amount M is no longer zero.

When the integrated leakage gas amount M is not zero, the arithmetic unit 104 next performs the determination operation in step S304. In step S304 the arithmetic unit 104 determines whether or not there is an engine stop request. For example, the arithmetic unit 104 determines that there is an engine stop request if it is detected that an engine stopping switch is operated by the driver, an engine stop condition is established in an idle stop vehicle, or an engine stop condition is established in a hybrid vehicle.

When there is an engine stop request, the arithmetic unit 104 executes processing from step S318 to step S321 that relates to the third scavenging control. The details of the third scavenging control are described later.

If there is not an engine stop request, next, the arithmetic unit 104 performs a determination operation in step S305. In step S305, the arithmetic unit 104 determines whether or not the integrated leakage gas amount M acquired in step S302 is equal to or greater than a previously determined second threshold value. The second threshold value is set to a value that is larger than the aforementioned first threshold value (threshold value used in step S202 in the flowchart in FIG. 8). More particularly, based on a minimum valve opening time period in the basic control of the fresh air introduction valve 74, the second threshold value is set so that leakage gas of an amount equal to or greater than an amount which can completely flow out within the minimum valve opening time period is not accumulated. If the integrated leakage gas amount M is less than the second threshold value, the processing thereafter is skipped since it is still too early to perform scavenging control.

If the integrated leakage gas amount M is equal to or greater than the second threshold value, next, the arithmetic unit 104 performs a determination operation in step S306. In step S306, the arithmetic unit 104 determines whether the pressure on the downstream side of the fresh air introduction valve 74 is a negative pressure.

If the pressure on the downstream side of the fresh air introduction valve 74 is a negative pressure, next, the arithmetic unit 104 performs a determination operation in step S307. In step S307, the arithmetic unit 104 determines whether or not an operation that decreases torque is possible. Here, the term "operation that decreases torque" means an actuator operation that has a torque reducing effect. For example, in addition to an operation that decreases a fresh air amount by reducing an opening degree of the throttle valve 24, increasing an opening degree of the waste gate valve in a case where the turbocharger 50 includes a waste gate valve, or retarding the closing timing of an intake valve in a case where the engine main body 4 includes a variable valve apparatus or the like, an operation that lowers efficiency by retarding the ignition timing or an operation that increases torque consumption by auxiliary equipment are included in such actuator operations.

In a case where the fresh air introduction valve 74 is open in a state where the pressure on the downstream side of the fresh air introduction valve 74 is a negative pressure, a flow of fresh air in the forward direction from the upstream side of the fresh air introduction valve 74 to the downstream side arises, and fresh air is thus introduced from the fresh air introduction passage 72 into the intake passage 10. An increase in fresh air as a result thereof causes an increase in the torque, and consequently the realized torque is excessive, relative to the requested torque. The aforementioned operation that decreases torque is an operation that is performed to counterbalance a torque increasing effect that is produced by introduction of fresh air into the intake passage 10 from the fresh air introduction passage 72, and suppress the occurrence of a divergence in the realized torque relative to the requested torque. Therefore, for example, in a situation in which torque cannot be reduced further, such as at a time of decelerating at a fastest rate, or in a case where the width in which torque can be adjusted is small, such as during idle operation, the processing thereafter is skipped since scavenging control cannot be performed.

In a case where an operation that decreases torque is possible, the arithmetic unit 104 executes processing from step S308 to step S311 that relates to the first scavenging control. In step S308, the arithmetic unit 104 opens the fresh air introduction valve 74 to a predetermined opening degree, and executes equal-torque control by means of an operation that decreases torque. By opening the fresh air introduction valve 74, leakage gas that accumulated on the upstream side of the fresh air introduction valve 74 flows out to the intake passage 10 on the downstream side of the throttle valve 24 together with fresh air. Further, by an operation that decreases torque being performed concurrently therewith, a torque increasing effect produced by the introduction of fresh air from the fresh air introduction passage 72 into the intake passage 10 is counterbalanced, and equal torque is thus also maintained during the introduction of fresh air opening the fresh air introduction valve 74.

In step S309, the arithmetic unit 104 calculates the residual leakage gas amount taking the integrated leakage gas amount M acquired in step S302 as an initial value. Specifically, the arithmetic unit 104 calculates a flow rate of gas that passes through the fresh air introduction valve 74 based on the pressure on the downstream side and the pressure on the upstream side of the fresh air introduction valve 74 and the opening degree of the fresh air introduction valve 74, and performs a subtraction operation with respect to the residual leakage gas amount in each calculation cycle based on the calculated gas flow rate.

In step S310, the arithmetic unit 104 determines whether or not the residual leakage gas amount calculated in step S309 is zero, that is, whether or not all the leakage gas that was accumulated on the upstream side of the fresh air introduction valve 74 has disappeared. This determination is performed for each calculation cycle. The arithmetic unit 104 selects the processing in step S309 and continues to update the residual leakage gas amount until the residual leakage gas amount becomes zero.

Subsequently, when the residual leakage gas amount becomes zero, the arithmetic unit 104 performs the processing in step S311. In step S311, the arithmetic unit 104 closes the fresh air introduction valve 74 and executes equal-torque control by ending the operation that decreases torque. As a result of closing the fresh air introduction valve 74, the torque increasing effect produced by the introduction of fresh air from the fresh air introduction passage 72 to the intake passage 10 disappears. Therefore, the operation that decreases torque is also ended, and thereby equal torque is also maintained after introduction of the fresh air ends.

By performing the first scavenging control by means of the above described processing, leakage gas that fills into the fresh air introduction passage 72 can be caused to flow out to the intake passage 10 at a position downstream of the throttle valve 24 while suppressing the occurrence of torque fluctuations.

Further, when the first scavenging control is completed, the arithmetic unit 102 is notified to that effect by the arithmetic unit 104. Upon receiving notification of the fact that the first scavenging control is completed, the arithmetic unit 102 resets the integrated leakage gas amount M to make the value of the integrated leakage gas amount M zero.

Note that, in a case where the first scavenging control is performed, the EGR rate of gas drawn into the cylinders from the intake passage 10 is decreased depending on the amount of fresh air that is introduced. Therefore, a configuration may also be adopted that estimates the EGR rate of gas drawn into the cylinders, and reflects the estimated value of the EGR rate in processing of another arithmetic unit (an unshown arithmetic unit other that the arithmetic units 101 to 104) that uses the EGR rate as information for control. The EGR rate of gas drawn into cylinders when the fresh air introduction valve 74 is open can be estimated based on information such as the fresh air amount measured by the air flow meter 20, the target EGR rate, the integrated leakage gas amount M, the average EGR rate E of leakage gas, and the gas amount that passes through the fresh air introduction valve 74.

In a situation in which the EGR rate cannot be decreased, such as in a case where fuel consumption performance is prioritized, a configuration may be adopted so as not to perform the first scavenging control. For that purpose, in the determination in step S306, it is sufficient to adopt a condition that recirculation of exhaust gas by the EGR apparatus 60 is not being performed in addition to the condition that the pressure on the downstream side of the fresh air introduction valve 74 is a negative pressure, and to perform an AND operation with respect to the two conditions.

On the other hand, if the condition in step S306 is not satisfied, next, the arithmetic unit 104 performs a determination operation in step S312. In step S312, the arithmetic unit 104 determines whether or not the pressure on the downstream side of the fresh air introduction valve 74 is a positive pressure, and the EGR rate of gas inside the surge tank 14 is zero. There is a response delay from a time that the EGR valve 66 is closed until the EGR rate of gas inside the surge tank 14 becomes zero. The arithmetic unit 104 estimates the EGR rate by a model that takes such a response delay into account. Note that, if an oxygen sensor is installed in the surge tank 14, the EGR rate may be determined based on an oxygen concentration measured by the oxygen concentration sensor. If the condition is not satisfied, the subsequent processing is skipped since scavenging control cannot be performed.

On the other hand, if the condition in step S312 is satisfied, next, the arithmetic unit 104 performs a determination operation in step S313. In step S313, the arithmetic unit 104 determines whether or not it is possible to perform an operation that increases torque. In this case, the term "operation that increases torque" means an actuator operation that has a torque increasing effect. For example, in addition to an operation that decreases a fresh air amount by increasing the opening degree of the throttle valve 24, decreasing an opening degree of the waste gate valve in a case where the turbocharger 50 includes a waste gate valve, or advancing the closing timing of an intake valve in a case where the engine main body 4 includes a variable valve apparatus or the like, an operation that decreases torque consumption by auxiliary equipment is also included in such actuator operations.

In a case where the fresh air introduction valve 74 is open in a state where the pressure on the downstream side of the fresh air introduction valve 74 is a positive pressure, a flow of fresh air in the backward direction from the downstream side of the fresh air introduction valve 74 to the upstream side arises, and fresh air flows backward from the intake passage 10 to the fresh air introduction passage 72. A decrease in fresh air as a result thereof causes a decrease in the torque, and causes a shortage to arise in the realized torque relative to the requested torque. The aforementioned operation that increases torque is an operation that is performed to counterbalance a torque reducing effect that is produced by the backward flow of fresh air to the fresh air introduction passage 72 from the intake passage 10, and suppress the occurrence of a divergence in the realized torque relative to the requested torque. Therefore, for example, in a situation in which torque cannot be increased further, such as during operation in a WOT state, or in a case where the width in which torque can be adjusted is small such as during idle operation, the processing thereafter is skipped since scavenging control cannot be performed.

In a case where an operation that increases torque is possible, the arithmetic unit 104 executes processing from step S314 to step S317 that relates to the second scavenging control. In step S314, the arithmetic unit 104 opens the fresh air introduction valve 74 to a predetermined opening degree, and executes equal-torque control by means of an operation that increases torque. By opening the fresh air introduction valve 74, leakage gas that accumulated on the upstream side of the fresh air introduction valve 74 flows into the intake passage 10 on the upstream side of the compressor together with fresh air. Further, by an operation that increases torque being performed concurrently therewith, a torque reducing effect that is produced by the backward flow of fresh air from the intake passage 10 to the fresh air introduction passage 72 is counterbalanced, and equal torque is thus also maintained during the backward flow of fresh air that is caused by opening of the fresh air introduction valve 74.

In step S315, the arithmetic unit 104 calculates a residual leakage gas amount by taking the integrated leakage gas amount M acquired in step S302 as an initial value. Specifically, the arithmetic unit 104 calculates a flow rate of gas that passes through the fresh air introduction valve 74 based on the pressure on the downstream side and the pressure on the upstream side of the fresh air introduction valve 74 and the opening degree of the fresh air introduction valve 74. Since the leakage gas accumulated on the downstream side of the fresh air introduction valve 74 is swept out into the intake passage 10 upstream of the compressor by gas that passes through the fresh air introduction valve 74, the residual leakage gas amount can be estimated by subtracting the residual leakage gas amount in each calculation cycle based on the calculated gas flow rate.

In step S316, the arithmetic unit 104 determines whether or not the residual leakage gas amount that was calculated in step S315 is zero, that is, whether or not all the leakage gas that was accumulated on the upstream side of the fresh air introduction valve 74 has disappeared. This determination is performed for each calculation cycle. The arithmetic unit 104 selects the processing in step S315 and continues to update the residual leakage gas amount until the residual leakage gas amount becomes zero.

Subsequently, when the residual leakage gas amount becomes zero, the arithmetic unit 104 performs the processing in step S317. In step S317, the arithmetic unit 104 closes the fresh air introduction valve 74 and executes equal-torque control by ending the operation that increases torque. As a result of the fresh air introduction valve 74 being closed, the torque reducing effect produced by the backward flow of fresh air to the fresh air introduction passage 72 from the intake passage 10 disappears. Consequently, the operation that increases torque is also ended, and thereby equal torque is also maintained after introduction of the fresh air ends.

By performing the second scavenging control by means of the above described processing, leakage gas that filled into the fresh air introduction passage 72 can be swept out into the intake passage 10 at a position upstream of the compressor 52 while suppressing the occurrence of torque fluctuations.

Further, when the second scavenging control is completed, the arithmetic unit 102 is notified to that effect by the arithmetic unit 104. Upon receiving notification of the fact that the second scavenging control is completed, the arithmetic unit 102 resets the integrated leakage gas amount M to make the value of the integrated leakage gas amount M zero.

Next, the third scavenging control will be described. If the result of the determination in step S304 is that an engine stop request was made, the arithmetic unit 104 executes processing from step S318 to step S321 that relates to the third scavenging control. In step S318, the arithmetic unit 104 opens the fresh air introduction valve 74 and also executes equal-torque control by means of an operation that decreases torque. That is, the third scavenging control is always executed when leakage gas is present, regardless of the size of the integrated leakage gas amount M. Further, since the engine 2 cannot be stopped while the third scavenging control is being executed, in order to finish the third scavenging control in the fastest time, the opening degree of the fresh air introduction valve 74 is set to a maximum opening degree within a range that can satisfy the requested torque in combined use with an operation that decreases torque. For example, in addition to an operation that decreases a fresh air amount by reducing the opening degree of the throttle valve 24 or by retarding the closing timing of the intake valve in a case where the engine main body 4 includes a variable valve apparatus, operations that decrease torque that can be executed with the third scavenging control also include an operation that lowers efficiency by retarding the ignition timing, and an operation that increases torque consumption by auxiliary equipment.

By opening the fresh air introduction valve 74 to the maximum opening degree that can satisfy the requested torque, leakage gas that accumulated on the upstream side of the fresh air introduction valve 74 flows out to the intake passage 10 on the downstream side of the throttle valve 24 together with fresh air. Further, by an operation that decreases torque being performed concurrently therewith, a torque increasing effect that is produced by the introduction of fresh air from the fresh air introduction passage 72 into the intake passage 10 is counterbalanced, and equal torque is thus also maintained during the introduction of fresh air by opening the fresh air introduction valve 74.

In step S319, the arithmetic unit 104 calculates the residual leakage gas amount taking the integrated leakage gas amount M acquired in step S302 as an initial value. Specifically, the arithmetic unit 104 calculates a flow rate of gas that passes through the fresh air introduction valve 74 based on the pressure on the downstream side and the pressure on the upstream side of the fresh air introduction valve 74 and the opening degree of the fresh air introduction valve 74, and performs a subtraction operation with respect to the residual leakage gas amount in each calculation cycle based on the calculated gas flow rate.

In step S320, the arithmetic unit 104 determines whether or not the residual leakage gas amount calculated in step S319 is zero, that is, whether or not all the leakage gas that was accumulated on the upstream side of the fresh air introduction valve 74 has disappeared. This determination is performed for each calculation cycle. The arithmetic unit 104 selects the processing in step S319 and continues to update the residual leakage gas amount until the residual leakage gas amount becomes zero.

Subsequently, when the residual leakage gas amount becomes zero, the arithmetic unit 104 performs the processing in step S321. In step S321, the arithmetic unit 104 closes the fresh air introduction valve 74 and executes equal-torque control by ending the operation that decreases torque. As a result of closing the fresh air introduction valve 74, the torque increasing effect produced by the introduction of fresh air from the fresh air introduction passage 72 to the intake passage 10 disappears. Therefore, the operation that decreases torque is also ended, and thereby equal torque is also maintained after introduction of the fresh air ends.

By performing the third scavenging control by means of the above described processing, leakage gas that filled into the fresh air introduction passage 72 can be caused to flow out to the intake passage 10 at a position downstream of the throttle valve 24 while suppressing the occurrence of torque fluctuations. Further, at the time point at which the third scavenging control is completed, the arithmetic unit 104 executes engine stop processing that stops the engine 2. Thereby, a situation in which the engine 2 stops in a state in which leakage gas remains in the fresh air introduction passage 72 is avoided.

Further, when the third scavenging control is completed, the arithmetic unit 102 is notified to that effect by the arithmetic unit 104. Upon receiving notification of the fact that the third scavenging control is completed, the arithmetic unit 102 resets the integrated leakage gas amount M to make the value of the integrated leakage gas amount M zero.

What is claimed is:

1. An internal combustion engine system comprising:
    a turbine provided in an exhaust passage of an internal combustion engine,
    a compressor arranged in an intake passage of the internal combustion engine and driven by the turbine,
    a throttle valve provided in the intake passage at a position downstream relative to the compressor,
    a fresh air introduction passage connecting an area upstream relative to the compressor and an area downstream relative to the throttle valve in the intake passage to communicate,
    a fresh air introduction valve provided in the fresh air introduction passage,
    an EGR apparatus configured to recirculate a part of exhaust gas from an area downstream relative to the turbine in the exhaust passage to an area between an inlet of the fresh air introduction passage and the compressor in the intake passage; and
    a control device configured to
    determine a target opening degree of the fresh air introduction valve based on an operating state of the internal combustion engine,
    estimate a leakage gas amount with respect to an amount of the exhaust gas leaking to an upstream side from a downstream side of the fresh air introduction valve when the fresh air introduction valve is closed, and open the fresh air introduction valve to a larger opening degree than the target opening degree if the leakage gas amount is equal to or greater than a predetermined value when opening the fresh air introduction valve to increase the amount of fresh air to the fresh air target amount.

2. The internal combustion engine system according to claim 1, wherein the control device is configured to open the fresh air introduction valve to an opening degree obtained by adding a correction opening degree to the target opening degree, and to increase the correction opening degree as a proportion of the exhaust gas to the leakage gas increases with increasing the amount of fresh air to the fresh air target amount.

3. The internal combustion engine system according to claim 2, wherein the control device is configured to lengthen a time period in which the correction opening degree is added to the target opening degree as the leakage gas amount increases, and to shorten the time period in which the correction opening degree is added to the target opening degree as the correction opening degree increases.

4. The internal combustion engine system according to claim 1, wherein the control device is configured to calculate a gas amount per unit time that flows from the downstream side to the upstream side of the fresh air introduction valve when a pressure on the downstream side is higher than a pressure on the upstream side of the fresh air introduction valve, and a gas amount per unit time that flows from the upstream side to the downstream side of the fresh air introduction valve when a pressure on the upstream side is higher than a pressure on the downstream side of the fresh air introduction valve, respectively, and estimate the leakage gas amount by integrating the calculated gas amounts.

5. The internal combustion engine system according to a claim 1, wherein the control device is configured to open the fresh air introduction valve to cause the leakage gas that is equivalent to the leakage gas amount to flow into the intake passage at a position downstream relative to the throttle valve together with fresh air if, at a time that the fresh air introduction valve is closed, the leakage gas amount is equal to or greater than a predetermined value, and a pressure on the upstream side is higher than a pressure on the downstream side of the fresh air introduction valve, and perform an actuator operation that has a torque reducing effect for counterbalancing a torque increasing effect produced by introduction of fresh air to the intake passage from the fresh air introduction passage.

6. The internal combustion engine system according to claim 1, wherein the control device is configured to open the fresh air introduction valve to cause the leakage gas equivalent to the leakage gas amount to flow into the intake passage at a position upstream relative to the compressor together with fresh air, if, at a time that the fresh air introduction valve is closed, the leakage gas amount is equal to or greater than a predetermined value, a pressure on the downstream side is higher than a pressure on the upstream side of the fresh air introduction valve, and recirculation of the exhaust gas is not being performed by the EGR apparatus, and perform an actuator operation that has a torque increasing effect for counterbalancing a torque reducing effect produced by a backward flow of fresh air to the fresh air introduction passage from the intake passage.

7. The internal combustion engine system according to claim 1, wherein the control device is configured to open the fresh air introduction valve to cause the leakage gas equivalent to the amount of the leaked exhaust gas to flow into the intake passage at a position downstream relative to the throttle valve together with fresh air, if, in a case where there is a request to stop the internal combustion engine, and perform an actuator operation that has a torque reducing effect for counterbalancing a torque increasing effect produced by introduction of fresh air to the intake passage from the fresh air introduction passage.

* * * * *